(12) United States Patent
De Gibon et al.

(10) Patent No.: US 8,726,170 B2
(45) Date of Patent: May 13, 2014

(54) DELIVERY OF CONTEXTUAL INFORMATION

(75) Inventors: Marc De Gibon, Saint Laurent du Var (FR); Christelle Scott, Roquefort les Pins (FR)

(73) Assignee: SAP AG, Walldorf (DE)

( * ) Notice: Subject to any disclaimer, the term of this patent is extended or adjusted under 35 U.S.C. 154(b) by 1186 days.

(21) Appl. No.: 12/261,611

(22) Filed: Oct. 30, 2008

(65) Prior Publication Data

US 2010/0115420 A1    May 6, 2010

(51) Int. Cl.
G06F 3/00        (2006.01)
G06F 12/14       (2006.01)
G06G 5/00        (2006.01)

(52) U.S. Cl.
CPC ... G06F 3/00 (2013.01); *G06G 5/00* (2013.01)
USPC ........... 715/751; 715/760; 717/101; 717/104; 726/21

(58) Field of Classification Search
CPC .............. G06F 3/00; G06F 3/048; G06G 5/00
USPC ...................... 715/751; 717/101, 104; 726/26
See application file for complete search history.

(56) References Cited

U.S. PATENT DOCUMENTS

| | | | |
|---|---|---|---|
| 6,177,932 B1* | 1/2001 | Galdes et al. | 715/733 |
| 7,146,616 B2* | 12/2006 | Dorner et al. | 719/318 |
| 7,337,405 B2* | 2/2008 | Weng et al. | 715/748 |
| 7,702,798 B2* | 4/2010 | Apreutesei et al. | 709/227 |
| 2003/0146932 A1* | 8/2003 | Weng et al. | 345/748 |
| 2003/0174155 A1* | 9/2003 | Weng et al. | 345/700 |
| 2003/0208459 A1* | 11/2003 | Shea et al. | 707/1 |
| 2007/0033196 A1* | 2/2007 | Moore | 707/10 |
| 2007/0033571 A1* | 2/2007 | Moore et al. | 717/104 |
| 2007/0162501 A1* | 7/2007 | Agassi et al. | 707/104.1 |
| 2007/0174390 A1* | 7/2007 | Silvain et al. | 709/204 |
| 2007/0232323 A1* | 10/2007 | Spriestersbach | 455/456.1 |
| 2007/0237130 A1* | 10/2007 | Milstein et al. | 370/352 |
| 2008/0052274 A1* | 2/2008 | Moore et al. | 707/3 |
| 2008/0077462 A1* | 3/2008 | Patel et al. | 705/7 |
| 2008/0244399 A1* | 10/2008 | Hilgers et al. | 715/708 |
| 2009/0132653 A1* | 5/2009 | Niazi | 709/204 |

* cited by examiner

*Primary Examiner* — Tadeese Hailu
(74) *Attorney, Agent, or Firm* — Mintz Levin Cohn Ferris Glovsky and Popeo, P.C.

(57) ABSTRACT

A communication is initiated between a first user and a second user via a collaboration channel. Thereafter, an identification of the second user relating to the collaboration channel is associated with a business entity (also referred to sometimes as a business partner). A service is automatically initiated that retrieves contextual information associated with the business entity in response to the initiation of the communication. A scope of the retrieved contextual information is based on a business partner type for the business entity. Subsequently, the first user is presented with at least a portion of the retrieved contextual information concurrently with the communication between the first user and the second user via the collaboration channel. Related apparatus, systems, techniques and articles are also described.

20 Claims, 6 Drawing Sheets

DELIVERY OF CONTEXTUAL INFORMATION

TECHNICAL FIELD

The subject matter described herein relates to techniques, systems, and articles for the delivery of contextual information to users relating to business partners.

BACKGROUND

Communications between individuals across different business entities can be sometimes be hampered when relevant information for such a business interaction is not readily available. As an example, a customer may utilize a collaboration channel such as a telephone call, a VOIP call, or a messaging chat session to contact a vendor. After such communication is established, the customer will often have to identify himself/herself so that the vendor can obtain information to help facilitate a successful resolution for the communication. Any delays with obtaining relevant information can result in increased costs associated with customer service because more time will be required to handle the communication. These delays can also result in lower customer satisfaction levels.

SUMMARY

In a first aspect, a communication is initiated between a first user and a second user via a collaboration channel. Thereafter, an identification of the second user relating to the collaboration channel is associated with a business entity (also referred to sometimes as a business partner). A service is automatically initiated that retrieves contextual information associated with the business entity in response to the initiation of the communication. A scope of the retrieved contextual information is based on a business partner type for the business entity. Subsequently, the first user is presented with at least a portion of the retrieved contextual information concurrently with the communication between the first user and the second user via the collaboration channel.

The scope of the retrieved contextual information can be limited by a role and authorization of the first user. With such arrangements, an external system can be polled to determine the role and authorization of the first user.

The association of the identification of the second user with the business entity can be effected by initiating a lookup service to associate the identifier of the second user with the business entity which can then be used to characterize the scope of the retrieved contextual information (i.e., query parameters can be limited based on the identified business entity).

Depending on the type of communication, various identifiers can be used to identify the second user. For example, with traditional telephone communications, a telephone number can be used. Similarly, for VOIP or other web-based voice communications, a telephone number or user name can be used. User names and/or e-mail addresses can also be used when communicating via instant messaging or other chat interfaces.

The retrieved contextual information can be displayed to the user in any of a variety of manners. In one arrangement, a list of links can be presented to the user. These links can comprise pre-defined categories, and initially, a number of documents/objects within each category can be displayed. Activation of a link can, in some implementations, initiate an additional service to retrieve documents or objects associated with the activated link.

In an interrelated aspect, a communication is initiated between a first user and a second user via a collaboration channel with the second user having an identification for the collaboration channel. Thereafter, a first service is automatically initiated to associate the identification with a business entity and to obtain query parameters for the business entity in response to the initiation of the communication. In addition, a second service is automatically initiated to retrieve contextual information associated with the business entity based on the obtained query parameters for the business entity. The retrieved contextual information can be divided into a plurality of categories so that the first user can be presented with a list of links for each of the categories. Activating one of the links can result in contextual information associated with the corresponding category being presented to the first user.

A retrieval service can sometimes be initiated in response to activation of one of the links to obtain documents or objects associated with the corresponding category for presentation to the first user.

In a further interrelated aspect, a communication between a first user and a second user via a collaboration channel is initiated in which the second user is associated with a business entity that in turn has a plurality of associated business objects accessible via service calls to systems arranged in a service-oriented architecture. Thereafter, transmission of at least one message via a service in a service-oriented architecture is automatically initiated to retrieve contextual information associated with the plurality of associated business objects in response to the initiation of the communication. A scope of the retrieved contextual information can be based on a type of business partner type for the business entity and a role and authorization of the first user. Subsequently, the first user can be presented with at least a portion of the retrieved contextual information concurrently with the communication between the first user and the second user via the collaboration channel.

Articles are also described that comprise a machine-readable storage medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, a user can more rapidly obtain contextual information to enhance the customer's experience for a communication on any modality. In addition, more rapid access to contextual information can also reduce an amount of time needed for a customer communication, thereby allowing users to be more efficient.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
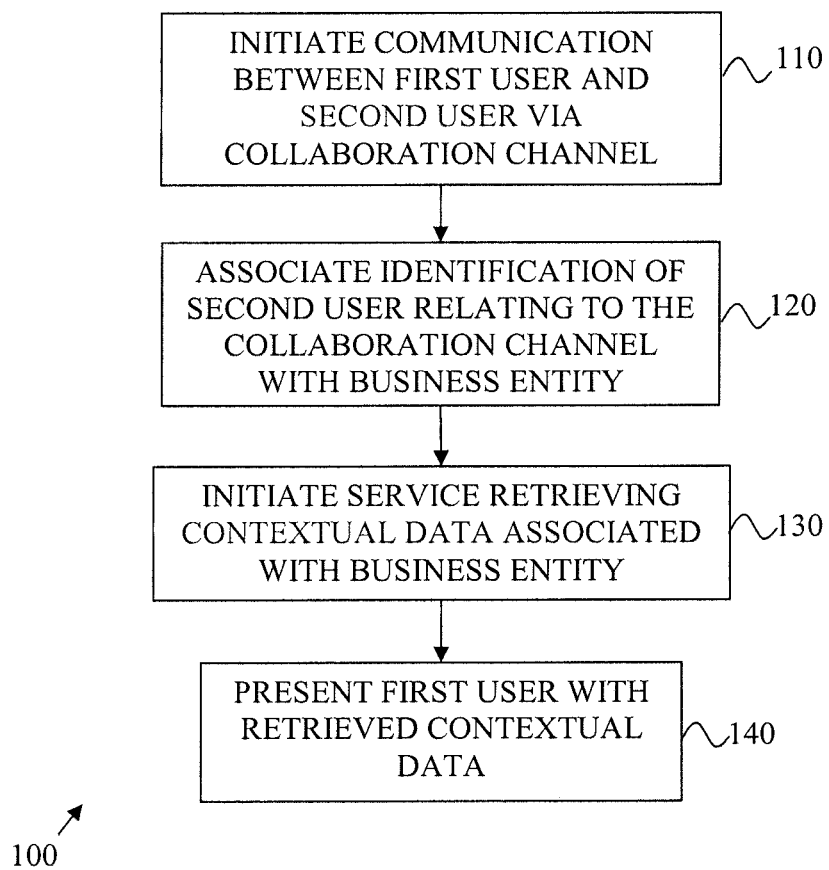
FIG. 1 is a process flow diagram illustrating the presentation of contextual information to a user in connection with the initiation of a communication via a collaboration channel.

FIG. 1 is a process flow diagram illustrating a method 100 in which, at 1 0, a communication between a first user and a second user is initiated via a collaboration channel. Thereafter, at 120, an identification of the second user relating to the collaboration channel is associated with a business entity. Once the second user has been identified and in response to the initiation o f the communication, at 130, a service retrieving contextual information associated with the business entity is automatically retrieved in response to the initiation of the communication. The scope of the retrieved contextual information can be based on a business partner type for the business entity. After the contextual information is retrieved, at least a portion of such data can be presented, at 140, to the first user concurrently with the communication between the first user and the second user via the collaboration channel.

Figure 2:
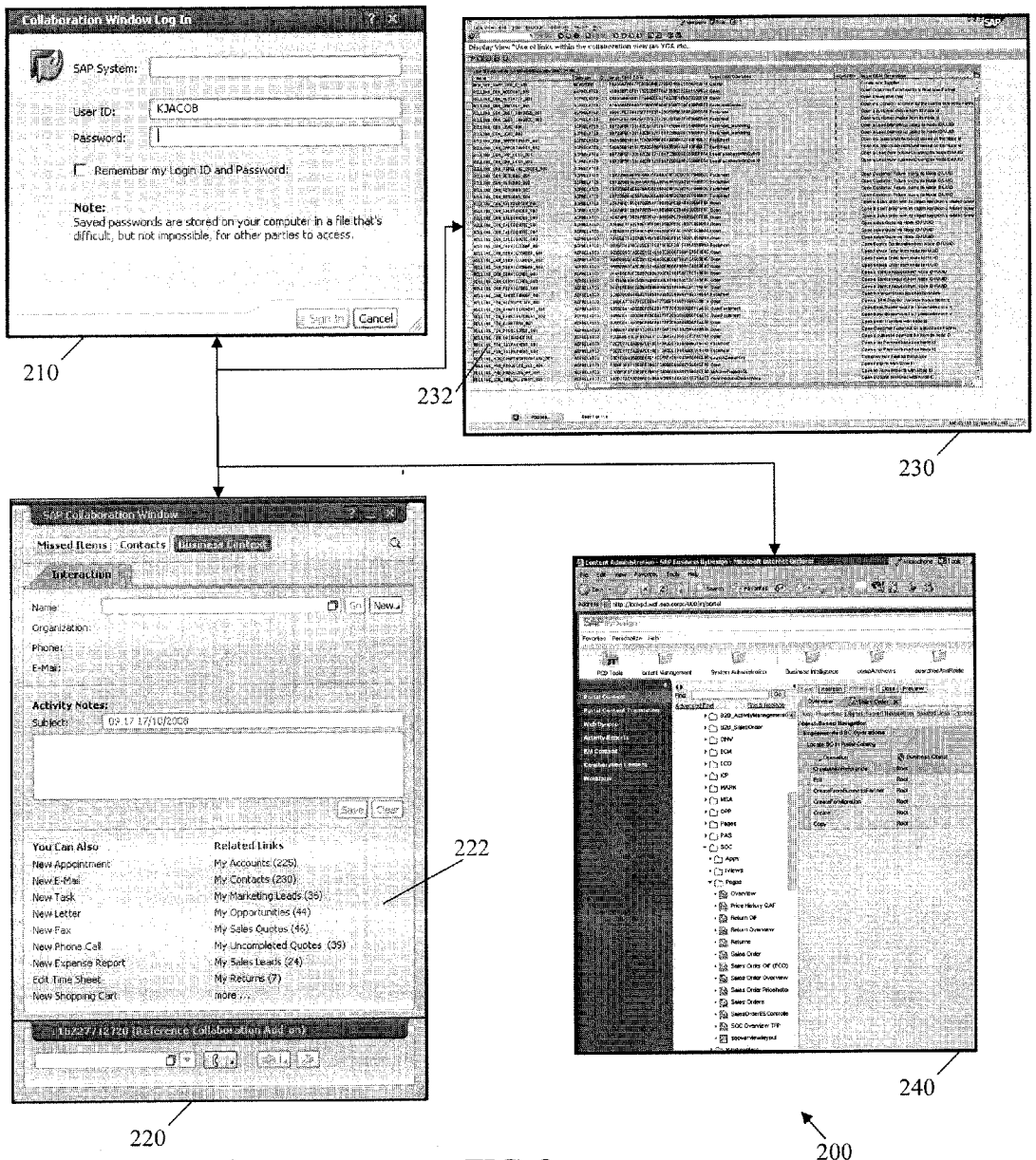
FIG. 2 is a diagram illustrating interfaces for presenting contextual information to a user relating to a business partner.

FIG. 2 is a diagram that includes multiple windows 210, 220, 230, 240 which provide an interface for a user to access contextual information regarding a business entity (which can include an individual, a group of individuals, a company, and the like). Using a login window 210, a user can provide an identification and password, which when authenticated, can result in a default work list window 220 to be displayed. The default work list window 220 can include a list of links 222 that pertain to the user. These links 222, when activated, can provide more information that has a finer granularity than what is initially presented. For example, the links 222 can provide categories of information that is available to the user such as account information, contacts, marketing leads, opportunities, sales quotes, uncompleted quotes, sales leads, returns, and more. In addition, the links 222 can also include a number of responsive documents/objects within such categories. If the user clicks on the contacts link, the user's client computer can contact a backend system to obtain a list of individual or groups of contacts can be displayed (either in the work list window 220 or in a separate links window 230). In some implementations, authorizations for the user can be obtained from a portal 240 in order to later determine which contextual information the user can access (and conversely which contextual information the user is not permitted to access). In some implementations, the contextual information presented to the user (in this case links) can be limited based on the user authorizations.

Figure 3:
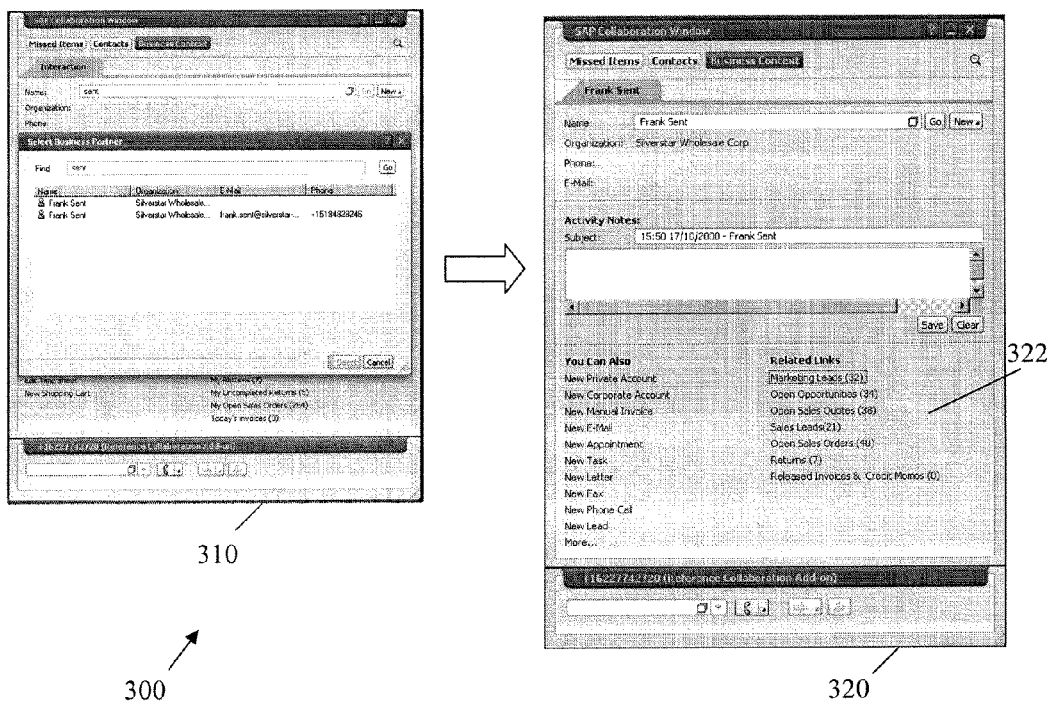
FIG. 3 is a diagram illustrating interfaces for identifying a business partner and presenting related contextual information.

FIG. 3 is a diagram 300 that illustrates interfaces to allow a user to manually search for a business partner and select a target business partner. The user can identify a business partner in a business partner selection window 310 using a list. Selection of a business partner causes a business partner information window 320 to be rendered. The business partner information window 320 can contain contextual information (in this case links 322 to additional information) relating to the business partner identified by the user in the business partner selection window 310. This contextual information can be obtained from a backend system, for example, via message exchange in a service-oriented architecture. If links are presented in the business partner information window 320 that relate to fixed categories, the backend system can be polled to obtain a number of responsive documents/objects to such categories and display same in connection with the links 322 in the business partner information window 320.

Figure 4:
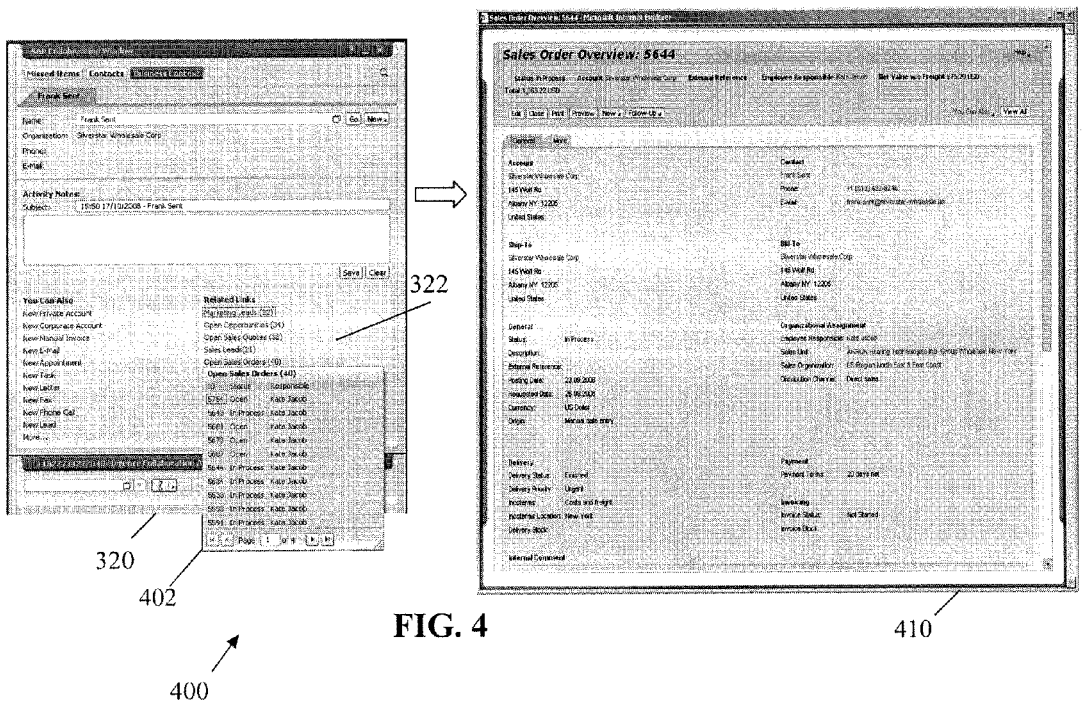
FIG. 4 is a diagram illustrating interfaces for selecting presented contextual information in order to obtain more detailed contextual information.

FIG. 4 is a diagram that illustrates a user interacting with a business partner information window 320 to obtain contextual information relating to a business partner that has a more finer granularity. In some variations, if the links 322 relate to categories of contextual information, selecting one of the links 322 can result in a menu 402 that lists documents/objects within the corresponding category. Selection of a document/object can cause a contextual information window 410 to be displayed which contains more detailed contextual information relating to the selected document/object. In this example, the user selected the Open Sales Order link 322 (which has 40 related documents/objects), causing the menu 402 to be displayed with descriptions characterizing a subset of the related document/objects. A graphical user interface element corresponding to a description relating to sales order 5644 is selected causing a backend system to be polled in order to obtain contextual information pertaining to the sales order (e.g., account information, shipping information, product information, delivery information, etc.) to be displayed in the contextual information window 410.

Figure 5:
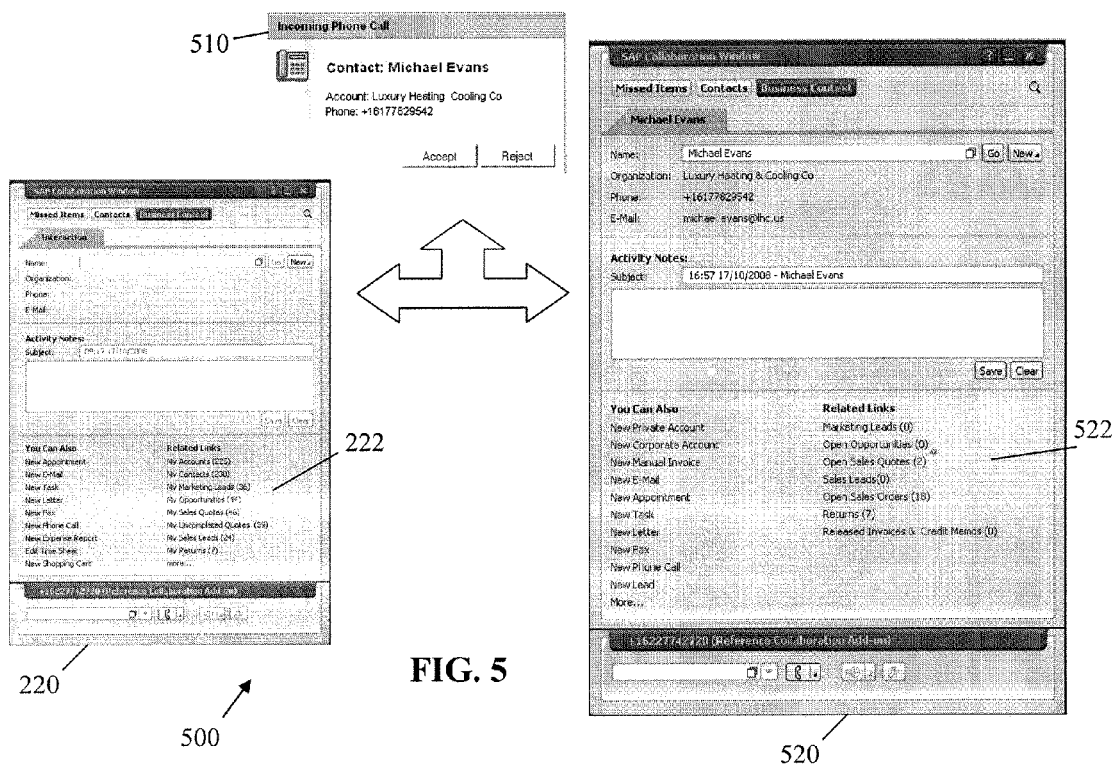
FIG. 5 is a diagram illustrating interfaces for automatically presenting contextual information upon initiation of a communication via a collaboration channel.

FIG. 5 illustrates an arrangement in which a user is presented with the work list window 220 during which a communication is initiated with a contact Michael Evans at Luxury Heating Cooling Co. (which is indicated by a communication information window 510 being displayed which identifies the caller). The communication can be conducted via any of a variety of collaboration channels including conventional voice telephone, VOIP, messaging, and more. Upon the initiation of the communication, a business partner repository is polled in order to associate an identifier of the customer (in this case the phone number) with contact information. The contact information is then used to poll a backend system for relevant contextual information. This relevant contextual information can be displayed in business partner window 520. In this case, the relevant contextual information takes the form of a list of links 522 which categorize further documents/objects which can be accessed by activating such links.

Figure 6:
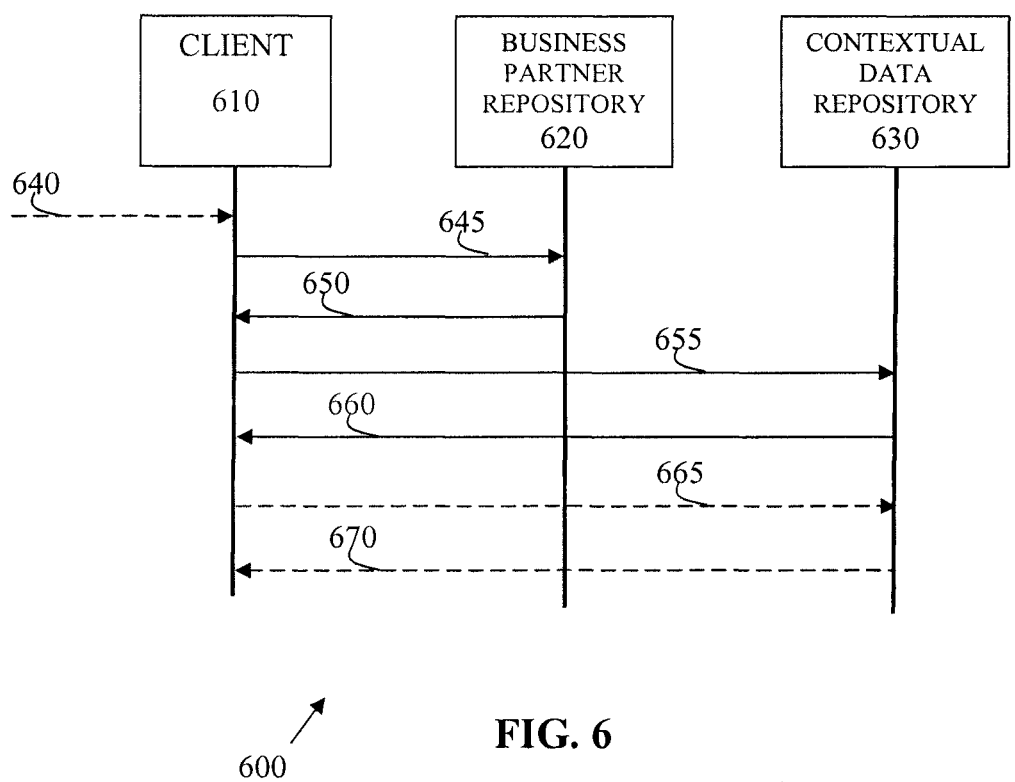
FIG. 6 is a messaging diagram illustrating messages exchanged among a client and various data repositories in a service-oriented architecture.

FIG. 6 is a messaging diagram 600 that illustrates message exchange to effect a display of contextual information in a service-oriented architecture that includes a client system 610, a business partner repository system 620, and a contextual information repository system 630. Upon initiation of a communication between a first user associated with the client system 610 and a second user via a collaboration channel (610) (which may or may not be initiated via a message), the client system 610 sends a first message 645 to the business partner repository system 620 that includes an identification of the second user. The identification user could be a telephone number, a screen name, an e-mail address, or any other identifier that is provided to the first user in connection with the communication over the collaboration channel. The business partner repository system 620 then maps the identifier in the first message 645 with a business partner, and then sends a second message 650 to the client system 610 that identifies the business partner. The client system 610 subsequently sends a third message to the contextual information repository system 630 requesting contextual information relating to the business partner. Thereafter, a fourth message 660 is returned to the client system 610 that contains such contextual information so that it can be presented to a user.

In some implementations, the fourth message 660 only contains a high level of contextual information such as number of items per pre-defined category (as described above), categories of contextual information, and/or other less granular contextual information. Such high level contextual information can be displayed to a user, and in response to user-generated input via a graphical user interface, the user can request more detailed (i.e., granular) information to be presented. In such cases, a fifth message 665 can be generated that identifies the high level contextual information selected via the user-generated input and send to the contextual information repository system 630. In response to the fifth message 665, the contextual information repository system 630 can retrieve requested detailed contextual information and send a sixth message 660 containing such information so that it can be presented to a user.

In some cases, the contextual information provided by the contextual information repository system 630 is limited by a role and authorizations for the user. In such cases, the authorization level of a user may be determined (either via the business partner repository system 620 or via an external authorization system) and such authorization level can be included in the third message 655.

The business partner repository system 620 and the contextual information repository system 630 can store the contextual information in a variety of manners, including encapsulation within business objects which can be accessed via service calls in a service-oriented architecture.

While the foregoing examples make reference to the contextual information being links, it will be appreciated that any sort of contextual information can be displayed using the techniques described herein. For example, a historical customer service log could be presented to a user when a customer calls the user. Moreover, while the interfaces are described as comprising multiple windows, each window presented herein can simply replace previously displayed windows (i.e., only one window is displayed at any given time). In addition, it will be appreciated that multiple messages can be sent (where only one is illustrated) to more than one system as may be required for a particular implementation.

The current subject matter can also be used to provide contextual access to a user (from the desktop) to floor plans to an end user by having an application owner register its content (e.g., link definitions, contextual rules, etc.) using a dedicated design environment. For example, there may be circumstances in which it might be useful to determine the context of a business partner (or an entity or person related to a business partner) without communicating with such business partner. In such cases, other mechanisms, including manual entry, can be used to identify a business partner so that contextual information for such business partner can be obtained.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable storage medium embodying instructions that when performed by one or more machines result in operations comprising:
   initiating a communication between a first user and a second user via a collaboration channel, the collaboration channel selected from a group consisting of: a telephone call, a Voice of Internet Protocol (VOIP) telephone call or an instant messaging session;
   automatically associating an identification of the second user relating to the collaboration channel with a business entity upon initiation of the communication;
   automatically initiating a service retrieving contextual information associated with the business entity in response to the initiation of the communication, a scope of the retrieved contextual information being based on a business partner type for the business entity; and presenting the first user with at least a portion of the retrieved contextual information concurrently with the communication between the first user and the second user via the collaboration channel.

2. An article as in claim 1, wherein the scope of the retrieved contextual information is limited by a role and authorization of the first user.

3. An article as in claim 2, wherein the non-transitory machine-readable storage medium further embodies instructions that when performed by one or more machines result in operations comprise:
polling an external system to determine the role and authorization of the first user.

4. An article as in claim 1, wherein the associating comprises:
initiating a lookup service to associate the identifier of the second user with the business entity to characterize the scope of the retrieved contextual information.

5. An article as in claim 4, wherein the identifier of the second user is a telephone number.

6. An article as in claim 4, wherein the identifier of the second user is an instant messaging user name.

7. An article as in claim 4, wherein the identifier of the second user is an e-mail address.

8. An article as in claim 1, wherein the retrieved contextual information is displayed as a plurality of links.

9. An article as in claim 8, wherein the plurality of links comprises pre-defined categories of contextual information.

10. An article as in claim 8, wherein the plurality of links characterize a number of documents or objects contained within each category.

11. An article as in claim 8, wherein activation of a link initiates an additional service to retrieve documents or objects associated with the activated link.

12. An article comprising a non-transitory machine-readable storage medium embodying instructions that when performed by one or more machines result in operations comprising:
initiating a communication between a first user and a second user via a collaboration channel, the second user having an identification for the collaboration channel, the collaboration channel selected from a group consisting of: a telephone call, a Voice of Internet Protocol (VOIP) telephone call or an instant messaging session;
automatically initiating a first service to associate the identification with a business entity and to obtain query parameters for the business entity in response to the initiation of the communication;
automatically initiating a second service to retrieve contextual information associated with the business entity based on the obtained query parameters for the business entity;
categorizing the retrieved contextual information into a plurality of categories;
presenting the first user with a list of links for each of the categories.

13. An article as in claim 12, wherein the non-transitory machine-readable storage medium further embodies instructions that when performed by one or more machines result in operations comprise:
initiating a retrieval service in response to activation of one of the links to obtain documents or objects associated with the corresponding category for presentation to the first user.

14. An article as in claim 12, wherein the non-transitory machine-readable storage medium further embodies instructions that when performed by one or more machines result in operations comprise:
automatically initiating an authorization service to determine the role and authorization of the first user, and wherein a scope of the contextual information is limited by the determined role and authorization of the first user.

15. An article comprising a non-transitory machine-readable storage medium embodying instructions that when performed by one or more machines result in operations comprising:
initiating a communication between a first user and a second user via a collaboration channel, the second user being associated with a business entity, the business entity having a plurality of associated business objects accessible via service calls to systems arranged in a service-oriented architecture, the collaboration channel selected from a group consisting of: a telephone call, a Voice of Internet Protocol (VOIP) telephone call or an instant messaging session;
automatically initiating transmission of at least one message via a service in a service-oriented architecture to retrieve contextual information associated with the plurality of associated business objects in response to the initiation of the communication, a scope of the retrieved contextual information being based on a type of business partner type for the business entity and a role and authorization of the first user; and
presenting the first user with at least a portion of the retrieved contextual information concurrently with the communication between the first user and the second user via the collaboration channel.

16. An article as in claim 15, wherein the non-transitory machine-readable storage medium further embodies instructions that when performed by one or more machines result in operations comprise:
automatically initiating transmission of at least one message via a lookup service to associate the second user with the business entity.

17. An article as in claim 16, wherein the lookup service uses an identifier of the second user in the collaboration channel to associate the second user with the business entity, the identifier of the second user being mapped to the business entity at a remote business partner repository accessed by the lookup service.

18. An article as in claim 15, wherein the non-transitory machine-readable storage medium further embodies instructions that when performed by one or more machines result in operations comprise:
automatically initiating transmission of at least one message via an authorization service to determine the role and authorization of the first user.

19. An article as in claim 15, wherein the non-transitory machine-readable storage medium further embodies instructions that when performed by one or more machines result in operations comprise:
receiving user-generated input associating the second user with the business entity.

20. An article as in claim 15, wherein the non-transitory machine-readable storage medium further embodies instructions that when performed by one or more machines result in operations comprise:
receiving user-generated input identify the role and authorization of the first user.

* * * * *